United States Patent [19]

Yamaguchi et al.

[11] 3,953,657

[45] Apr. 27, 1976

[54] METHOD FOR COATING PARTICULATE SOLIDS WITH POLYMERS

[75] Inventors: Tadashi Yamaguchi; Takayuki Ono, both of Sendai; Hiroshi Hoshi, Narashino; Michio Hirakawa; Isao Watanabe, both of Ichikawa, all of Japan

[73] Assignee: Mitsui Toatsu Kagaku Kabushiki Kaisha, Tokyo, Japan

[22] Filed: Jan. 28, 1974

[21] Appl. No.: 437,393

[30] Foreign Application Priority Data
Jan. 29, 1973 Japan.............................. 48-11116
Feb. 5, 1973 Japan.............................. 48-14520

[52] U.S. Cl................................. 428/406; 264/109; 427/221; 428/404; 428/407
[51] Int. Cl.²..................... B32B 17/02; B32B 19/00

[58] Field of Search........ 117/100 S, 100 B, 100 M; 260/42.53; 427/221; 428/404, 406, 407

[56] References Cited
UNITED STATES PATENTS

| | | | |
|---|---|---|---|
| 3,330,693 | 7/1967 | Rumberger...................... | 117/100 B |
| 3,448,073 | 6/1969 | McManimie...................... | 260/42.53 |
| 3,544,500 | 12/1970 | Osmond et al.................. | 117/100 B |
| 3,661,620 | 5/1972 | Dekking et al.................. | 117/100 S |

*Primary Examiner*—Ronald H. Smith
*Assistant Examiner*—Dennis C. Konopacki
*Attorney, Agent, or Firm*—William J. Daniel

[57] ABSTRACT

Particulate solids are coated with a polymer by bringing a particulate solid selected from glass particles, abrasive particles and sand particles into contact with a vinyl monomer in the presence of a polymerization intiator consisting essentially of bisulfite ions.

6 Claims, No Drawings

METHOD FOR COATING PARTICULATE SOLIDS WITH POLYMERS

BACKGROUND OF THE INVENTION

This invention relates to a method for effectively coating inorganic particulate solids with polymers. More particularly, this invention relates to a method for effectively coating the surface of inorganic particulate solids with a polymer which comprises polymerizing a vinyl monomer by using as polymerization initiator system a combination of inorganic particulate solids per se and bisulfite ions.

A method is known for coating particulate solids with polymers which comprises dispersing particulate solids into water or an organic solvent, adding thereto a vinyl monomer, and effecting polymerization of the monomer in the presence of a water-soluble or oil-soluble polymerization initiator, thereby forming a polymer on the surface of the particulate solids. However, glass surfaces have poor affinity for polymers and display insufficient binding action for polymers. Accordingly, it is extremely difficult to manufacture glass products having an even and sufficiently thick polymer coating by this known method.

On the other hand, there are known as ways for manufacturing artificial abrasive material (1) a process wherein abrasive particles are mixed with methyl methacrylate and a polymer thereof and the mixture is heated and compressed in the presence of a peroxide (Japanese Patent Publn. No. 1667/Sho. 24), (2) a process wherein abrasive particles and plastic powder are kneaded together with an unvulcanized rubber composition and then the kneaded mixture is molded into a desired shape and cured by heating (Japanese Patent Publn. No. 1897/Sho. 29) and (3) a process wherein a mixture of abrasive particles and polymer powder is incorporated with a monomer capable of dissolving or swelling the polymer and thereafter the mixture is heated and compressed (Japanese Patent Publn. No. 9547/Sho. 35). These known processes utilize adhesive polymers for binding abrasive particles. However, these processes have some drawbacks: the binding force between the abrasive particles and polymer is small, the strength of abrasive mass is low, and local agglomeration of abrasive particles in the polymer binder tends to take place so that products of a given uniform quality cannot be obtained.

For making casting sand, it is known to coat sand particles with a partial reaction product between a phenol resin and hexamethylenetetramine, and to apply to sand particles a surface coating layer of a resin formed by temporarily fusing a powdery resin on the particle surface. In these polymer-coated sand particles, the polymer coating is fixed onto the surface of the particles mainly by physical binding force. Accordingly, such coating tends to peel off during transport or storage. Moreover, the production of the coated sand particles necessitates heating and cooling operations so that the cost of equipment increases and the required operations more complicated and troublesome. On the other hand, the use of a relatively large amount of a polymer is required for completely binding individual sand particles and, if dies are manufactured from casting sand containing such a large amount of a polymer, they will inevitably evolve gases and cause deformation or destruction when molten metal or the like is cast therein.

The present inventors already found that when a transition metal or a compound thereof was brought into contact with a vinyl monomer in the presence of bisulfite ions, the combination of the transition metal, or a compound thereof, and the bisulfite ions functioned as a polymerization initiating system and a polymer was preferentially produced on the surface of particles of the transition metal or a compound thereof thereby forming particles evenly coated with the polymer. As the result of further research, it has now been found that equivalently good results can also be obtained when glass particles, abrasive particles and sand particles are used in lieu of transition metal particles.

BRIEF SUMMARY OF THE INVENTION

Accordingly, it is an object of this invention to provide a method for effectively coating glass particles, abrasive particles and sand particles with polymers.

It is another object of this invention to provide a glass base particulate molding material.

It is still another object of this invention to provide a method of making abrasive articles from abrasive particles coated with a polymer.

It is a further object of this invention to obtain a casting sand possessing good moldability and strong binding force.

These and other objects of this invention will become more apparent in the detailed description and examples which follow.

DETAILED DESCRIPTION OF THE INVENTION

The term "vinyl monomer" is used herein to mean a compound capable of vinyl-type polymerization in the presence of a radical polymerization initiator.

Illustrative of such monomers are unsaturated carboxylic acids, such as acrylic acid and methacrylic acid and their salts and esters; unsaturated nitriles, such as acrylonitrile and methacrylonitrile; halogenated olefins, such as vinyl chloride and vinylidene chloride; aliphatic vinyl esters, such as vinyl acetate and vinyl propionate; and aromatic vinyl compounds, such as styrene and divinylbenzene.

The term "substance capable of providing bisulfite ion" is used herein to mean a substance capable of yielding bisulfite ion in an aqueous or alcoholic medium.

Examples of such substances include sulfur dioxide, an aqueous solution of sulfurous acid, bisulfites, such as ammonium bisulfite and sodium bisulfite, a combination of a sulfite, such as sodium sulfite or potassium sulfite and a mineral acid such as sulfuric acid.

In accordance with a preferred embodiment of this invention, particulate solids selected from glass particles, abrasive particles, and sand particles are suspended into an aqueous or alcoholic medium, then a vinyl monomer and a substance capable of providing bisulfite ion are added to the medium and the mixture is continuously stirred until polymerization of the monomer proceeds sufficiently to effect coating of the particles with the resulting polymer. In this case, no special limitation exists on the order of adding the individual ingredients. The solid particulates may be added to a reaction medium previously containing a vinyl monomer and a substance capable of providing bisulfite ion.

In addition to ordinary glass, potash glass, lead glass and other special glasses can be used as the glass ingredient for this invention. These glass ingredients may be in the form of powders, granules, and beads. Useful as the abrasive particles are natural abrasive particles, such as corundum, emery, garnet, tripoli and diamond, and artificial abrasive particles, such as silicon carbide, boron carbide, tungsten carbide and artificial diamond. As the sand particles, there can be mentioned silica sand, chromite sand, zircon sand and forsterite sand. Preferably, these particulate solids have a particle size of 100–300 mesh.

The vinyl monomer is used in an amount of 1–100 parts by weight per 100 parts by weight of the particulate solids. In case the product is to be used as material for abrasive articles or for casting sand, the vinyl monomer is used preferably in an amount of 1–10 parts by weight per 100 parts by weight of the particulate solid. The substance capable of providing bisulfite ion is used in an amount of 0.01–15 parts by weight (in terms of sulfur dioxide) per 100 parts by weight of the vinyl monomer.

The present polymerization reaction is initiated only when the glass particles, abrasive particles or sand particles are in the presence of the sulfite ions. Omission of either of these two ingredients fails to initiate the polymerization reaction. The presence of oxygen was found to promote the polymerization reaction. There is no particular limitation for the polymerization of this invention and any type of polymerization, e.g., suspension polymerization or emulsion polymerization, can be adopted in the process of this invention.

The reaction product obtained by such polymerization is subjected to filtration to recover a solid product which is then washed with water and dried to yield the end product. The resulting solid substances coated with a polymer leave the polymer when extracted with an organic solvent such as benzene for 20 hours or longer. It is recognized, therefore, that the polymer is graft polymerized onto the surface of the solid particles. By virtue of such graft polymerization, the resulting solid particles have such a characteristic merit that they exhibit a strong binding force even with a low polymer content.

The polymer-coated abrasive particles obtained according to the method of this invention can be used for manufacturing abrasive bodies by molding the particles under heating and pressure into pillar, plate and other suitable shape. In this case, the abrasive particles having a lesser content of the coated polymer, for example, those having a polymer content of 20% by volume or less, may be molded while dispersed into thermoplastic or thermosetting resin. Since the polymer-coated abrasive particles are extremely good in compatibility with polymers as compared with untreated abrasive particles, they can be homogeneously dispersed into the resin.

The heating temperature for molding varies according to the type of monomer used, but is generally within the range of 100°–250°C. The pressure of molding is within the range of 150–450 kg/cm$^2$ but a higher pressure may be adopted if necessary.

The polymer-coated glass particles obtained according to the invention are useful as molding materials and fillers. Especially, the polymer-coated glass beads can be compression molded under heating to manufacture reflectors.

This invention will more clearly be understood with reference to the following examples.

EXAMPLE 1

A 500 ml 3-necked glass flask was equipped with a stirrer and dipped in a constant temperature bath maintained at 50°C. In the flask were placed 380 g of water and 100.0 g of glass beads having a granule size of 200 mesh. To this mixture were added 20.0 g of methyl methacrylate and 20.0 ml of a 2-N aqueous solution of sulfurous acid and the whole was reacted with stirring for 3 hours. After completion of the reaction, the stirring was stopped and the reaction mixture was observed. It was then found that the polymer and glass beads were not separate but formed a combined uniform slurry. This product was recovered by filtration, washed with water and then dried under reduced pressure to obtain 116.0 g of a dried product, which had a poly(methyl methacrylate) content of 14.0% and was thus determined to have a rate of polymerization of 80%. Microscopic observation of the product showed that an even thick coating of poly(methyl methacrylate) formed on the surface of the individual glass beads. This dried product gave moldings having a bending strength of 200 kg/cm$^2$ when compression molded at 180°C for 15 minutes under a pressure of 250 kg/cm$^2$.

Comparative Example

In the same apparatus as used in Example 1 were placed 400 g of water and 100.0 g of glass beads having a granule size of 200 mesh. The air in the apparatus was replaced by nitrogen under agitation. To the mixture were added 20.0 g of methyl methacrylate, 0.10 g of potassium persulfate and 0.10 g of sodium bisulfite and the whole was reacted for 3 hours with stirring in nitrogen atmosphere. After completion of the reaction, the stirring of the mixture was interrupted and the reaction mixture was observed. It was found that a polymer and the glass beads were separately formed in the upper layer and in the lower layer, respectively. Thus, the surface of glass beads could not be coated with a polymer in a conventional polymerization system using a redox catalyst.

The reaction product was filtered and the recovered solids were washed with water and then dried at 130°C under reduced pressure to obtain 118.2 g of a dried product, which had a poly(methyl methacrylate) content of 15.4% and was determined to have a rate of polymerization of 91%.

This dried product was thoroughly mixed in a mortar and then subjected to compression molding operated at 180°C for 15 minutes under a pressure of 250 kg/cm$^2$, whereby moldings having a bending strength of 95 kg/cm$^2$ were obtained.

EXAMPLE 2

In a 50 l four-necked glass flask dipped into a constant temperature bath maintained at 50°C were placed 3.8 kg of water and 400 g of glass powder (Nittobo PF, chromium treated; 50–100 mesh). To the mixture were added 60 g of methyl methacrylate and 0.20 kg of a 2-N aqueous solution of sulfurous acid, with the glass powder being dispersed in the water. The mixture was reacted for 4 hours in the air. After completion of the reaction, the slurried product was filtered and the recovered solids were washed with water and then dried at 130°C to obtain 445 g of a composition, which had a poly(methyl methacrylate) content of 10.1% and was determined to have a rate of polymerization of 75%. A microscopic observation of the composition showed that almost all of the glass powder was coated with poly(methyl methacrylate). This product was compression molded in a manner similar to that described in Example 1 to obtain moldings having a bending strength of 215 kg/cm².

EXAMPLE 3

In a 50 ml 3-necked flask equipped with a stirrer were placed 3.00 g of artificial diamond (about 300 mesh), 0.60 g of methyl methacrylate, 0.10 g of methyl acrylate and 20 ml of water. After the temperature of the mixture was elevated to 60°C, 1.0 ml of a 1-N aqueous solution of sulfurous acid was added to the mixture under agitation and the whole was reacted at 60°C for 4 hours. The reaction product was filtered and the recovered solid was washed with water and then dried to vacuo at 120°C to obtain 3.65 g of the end product. A microscopic observation of the end product showed that a high molecular substance was efficiently coated on the surface of the artificial diamond particles. By pulverizing the end product and compression molding it at 190°C under a pressure of 200 kg/cm², an abrasive product was obtained in which the polymer and the abrasive particles were dispersed in extremely high efficiency. In comparison with a similar abrasive manufactured by polymerizing the monomer by the aid of a conventional radical polymerization initiator such as benzoyl peroxide, the molded body of the invention had a strong binding force between the abrasive particles and the polymer so that the abrasive particles were hardly worn off from the body and, even if the particles were worn off, a new abrading surface would appear without scratching the surface of a material to be polished. Thus, the product is suited for use in fine polishing.

EXAMPLE 4

In a 300 ml reaction vessel provided with a stirrer were placed 50.0 g of each of various kinds of abrasive particles (180–200 mesh), a given amount of a monomer and 200 ml of water. After the temperature of the mixture was raised to 60°C, 0.60 g of gaseous sulfur dioxide was blown for 30 minutes into the mixture under agitation and the mixture was reacted at 60°C for 8 hours. The reaction product was filtered and a solid substance was washed with water and then dried at 120°C under vacuum to yield solid polymercoated abrasive particles. Observation of the product by an electron microscope showed that the abrasive particles were coated with a polymer with extremely high efficiency. A molded article obtained by compression molding the product at 200°C under a pressure of 250 kg/cm² was tough and excellent in wear-resisting property compared with commercially available abrasives. Table 1 shows the polymer content and bending strength of the products using the various abrasive particle.

TABLE 1

| Ex. No. | Abrasive Particles | Monomer[1] Used | (g) | Polymer Content of Prod (wt. %) | Bending Strength of Molded Article (kg/cm²) |
|---|---|---|---|---|---|
| 1 | Alundum | MMA | 10 | 14.2 | 409 |
| 2 | Carborundum | Vinyl Chloride | 20 | 18.9 | 412 |
| 3 | Chromium oxide | AN St | 10 10 | 11.2 | 365 |
| 4 | Silica sand | MMA MA | 12 3 | 20.9 | 457 |
| 5 | Pumice | MMA | 25 | 32.5 | 301 |

[1]MMA stands for methyl methacrylate,
MA for methyl acrylate,
AN for acrylonitrile and
St for styrene.

EXAMPLE 5

Using the same apparatus as in Example 4, 50.0 g of alundum, 10.0 g of powdery asbestos and 20.0 g of methyl methacrylate were suspended in 400 ml of water. To the mixture were added 200 ml of a 1-N aqueous solution of sulfurous acid and the whole was reacted at 60°C for 6 hours under agitation. The reaction product was filtered and the recovered solid was dried at 120°C in vacuo to obtain 78.2 g of an end product. An observation of the end product by electron microscope showed that the abrasive particles and asbestos were efficiently coated with poly(methyl methacrylate). A molded article was obtained by compression molding the solid product at 200°C under a pressure of 400 kg/cm² in which the abrasive particles and asbestos were homogeneously dispersed. It was excellent in toughness and in wear-resistance, as compared with abrasive articles obtained by conventional methods.

EXAMPLE 6

In a reactor provided with a stirrer were placed 10.0 kg of No. 6 silica sand, 0.70 kg of methyl methacrylate, 0.10 kg of methyl acrylate, and 40 liters of water. To this mixture was added at 55°C 1.0 kg of a 1N aqueous solution of sulfurous acid and the mixture was reacted for 3 hours. The resulting slurry was filtered and a solid substance was washed with water and then dried at 130°C to obtain 10.72 kg of a solid product having a polymer content of 6.8%. When the solid product was pulverized and observed by electron microscope, it was found that the individual silica sand particles were coated evenly with a plastic material.

The sand particles thus obtained were compression molded at 200°C for 5 minutes under a pressure of 150 kg/cm² to form a core (for casting use), which had a high flexural strength of 74 kg/cm². The use of this core for casting gave products having a better surface condition than when using an oil core. After casting, disintegration of the core was found very good.

In a similar manner, cores were manufactured from sand particles coated with polystyrene and polyvinyl acetate and these cores (each having a polymer content of 3.5 wt %) were used for casting tests. The cores were broken easily after casting and the surface appearance of the cast product was good.

Table 2 shows the state of disintegration of cores as well as the surface condition of cast products observed when the content of poly(methyl methacrylate) was varied. For comparison, the strength of the cores before casting is also shown.

TABLE 2

| Polymer Content (%) | Strength of Cores before Casting (kg/cm²) | Disintegration of Cores | Surface Condition of Cast Products |
|---|---|---|---|
| 10.2 | 220 | Good | Bad |
| 5.1 | 71 | Good | Good |
| 3.0 | 35 | Good | Good |

EXAMPLE 7

In a reactor provided with a stirrer were placed 10.0 kg of zircon sand (100–150 mesh 15%; 150–200 mesh 61%; and 200–300 mesh 24%), 0.60 kg of methyl methacrylate, 0.10 kg of N-methylolacrylamide and 40 liters of water. After maintaining the mixture at 55°C, 500 g of a 1-N aqueous solution of sulfurous acid were added thereto and the whole was reacted for 3 hours. After completion of the reaction, the resulting slurry was filtered and a solid product was washed with water and dried at 80°C in vacuo to obtain 10.61 kg of a solid mass having a polymer content of 5.8%. This solid mass could easily be pulverized. Observation of the pulverized product by an electron microscope showed that the individual sand particles were coated evenly with a plastic material.

The resultant zircon sand particles coated with methyl methacrylate-N-methylolacrylamide copolymer were melt injected into a metal die to a thickness of 3 mm under the following conditions:

| | |
|---|---|
| Injection rate: | 5 kg/hour |
| Compressed air pressure: | 3 kg/cm² |
| Air consumption rate: | 8 m³/hour |
| Fuel gas consumption rate: | 1.2 m³/hour |

When the cast product was released from the metal die, no peel-back occurred. The product had a flexural strength at 78 kg/cm². The shell mold thus obtained was used for casting products which had a good surface condition. Disintegration of the shell mold was found very good as compared with a conventional mold of the phenol resin series.

EXAMPLE 8

80 parts by weight of dry sand, 5 parts by weight of sodium silicate and 2 parts by weight of graphite were mixed and well kneaded. The mixture was placed in a core mold and solidified while passing therethrough a stream of carbon dioxide. The mixture was released from the mold and the core thus obtained was coated with a dispersion of a casting sand (polymer content 20%; obtained in a manner similar to Example 1) in organic solvents. The composition of this coating dispersion was as follows:

| Ingredients | Parts by Weight |
|---|---|
| Casting sand | 15 |
| Methanol | 50 |
| Acetone | 15 |
| Isopropanol | 20 |

The core was dried at 50°C and mounted to a mold for casting. Burning and sticking phenomena were rarely found in cast products obtained by using this mold, unlike the case of using air dried molds to which a mold-coating agent had been applied. This core adsorbs only a very small amount of moisture when stored for a long period of time.

What is claimed is:

1. A method for coating the surface of particulate solids with a polymer, characterized in that a solid selected grom the group consisting of glass particles, abrasive particles and sand particles are brought into contact in an aqueous or alcoholic medium with a vinyl monomer in the presence of a polymerization initiator consisting essentially of bisulfite ions to form a polymer on the surface of said particulates.

2. A method according to claim 1 wherein the particulate solid is glass particles.

3. A method according to claim 1 wherein the particulate solid is abrasive particles.

4. A method according to claim 1 wherein the particulate solid is sand particles.

5. Coated glass particles for use in molding which comprises the product obtained according to claim 2.

6. A casting sand comprising the product obtained according to claim 4.

* * * * *